US012657807B2

(12) United States Patent
Fan et al.

(10) Patent No.: US 12,657,807 B2
(45) Date of Patent: Jun. 16, 2026

(54) IMAGE RENDERING METHOD BASED ON 3D SCENE LAYER AND RENDER LAYER, ELECTRONIC DEVICE, AND STORAGE MEDIUM

(71) Applicant: Beijing Zitiao Network Technology Co., Ltd., Beijing (CN)

(72) Inventors: Jiaqi Fan, Beijing (CN); Fengwei Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 426 days.

(21) Appl. No.: 18/022,712

(22) PCT Filed: Oct. 27, 2022

(86) PCT No.: PCT/CN2022/127844
§ 371 (c)(1),
(2) Date: Feb. 22, 2023

(87) PCT Pub. No.: WO2023/207001
PCT Pub. Date: Nov. 2, 2023

(65) Prior Publication Data
US 2024/0257436 A1      Aug. 1, 2024

(30) Foreign Application Priority Data

Apr. 29, 2022     (CN) .......................... 202210474959.3

(51) Int. Cl.
*G06T 15/04*          (2011.01)
*G06T 15/80*          (2011.01)

(52) U.S. Cl.
CPC .............. *G06T 15/04* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 6,922,199 B2 | 7/2005 | Hunter | |
| 2024/0046565 A1* | 2/2024 | Wernau | ................ G01C 21/383 |

FOREIGN PATENT DOCUMENTS

| | | |
|---|---|---|
| CN | 109242943 A | 1/2019 |
| CN | 109389664 A | 2/2019 |

(Continued)

OTHER PUBLICATIONS

Jed Lengyel, John Snyder, "Rendering with Coherent Layers", 1997, SIGGRAPH '97 Proceedings of the 24th Annual Conference on Computer Graphics and Interactive Techniques, pp. 233-242 (Year: 1997).*

(Continued)

*Primary Examiner* — Michael J Cobb
(74) *Attorney, Agent, or Firm* — Astute IP Law Group

(57) ABSTRACT

An image rendering method includes the following: A to-be-processed pixel in a 3D scene layer, a target pixel in the 3D scene layer, a pixel attribute of the to-be-processed pixel, and a pixel attribute of the target pixel are determined according to a map attribute of a to-be-processed map of a 3D on-screen scene, and a map attribute of a target map of the 3D on-screen scene; the target map is rendered onto a render layer according to the map attribute of the target map; a target rendering image corresponding to the 3D on-screen scene is determined based on the 3D scene layer and the render layer, and the target rendering image is projected and displayed.

14 Claims, 2 Drawing Sheets

Determine a to-be-processed pixel in a 3D scene layer, a target pixel in the 3D scene layer, a pixel attribute of the to-be-processed pixel, and a pixel attribute of the target pixel according to a map attribute of a to-be-processed map of a 3D on-screen scene, and a map attribute of a target map of the 3D on-screen scene      S110

Render the target map onto the render layer according to the map attribute of the target map      S120

Determine, based on the 3D scene layer and the render layer, a target rendering image corresponding to the 3D on-screen scene, and project and display the target rendering image      S130

(56)          References Cited

FOREIGN PATENT DOCUMENTS

| CN | 109657172 A | 4/2019 |
| CN | 112288873 A | 1/2021 |
| CN | 112734896 A | 4/2021 |
| CN | 114782612 A | 7/2022 |

OTHER PUBLICATIONS

Supplementary European Search Report in European Application No. 22851003.8, mailed Feb. 23, 2024, 4 pages.
Guenter et al., "Foveated 3D graphics", ACM Transactions on Graphics, vol. 31, No. 6, Nov. 2012, 10 pages.
International Search Report and Written Opinion issued in International Patent Application No. PCT/CN2022/127844 on Dec. 27, 2022.
First Office Action for Chinese Patent Application No. 202210474959.3, mailed on Dec. 17, 2024, 14 Pages.

* cited by examiner

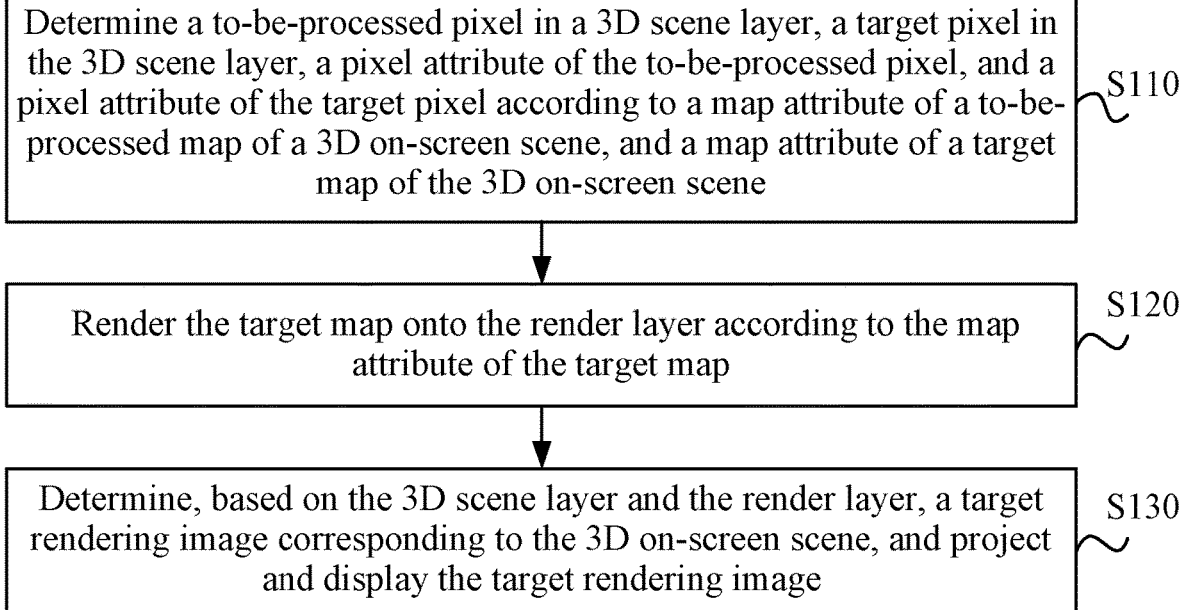

| Determine a to-be-processed pixel in a 3D scene layer, a target pixel in the 3D scene layer, a pixel attribute of the to-be-processed pixel, and a pixel attribute of the target pixel according to a map attribute of a to-be-processed map of a 3D on-screen scene, and a map attribute of a target map of the 3D on-screen scene | S110 |

| Render the target map onto the render layer according to the map attribute of the target map | S120 |

| Determine, based on the 3D scene layer and the render layer, a target rendering image corresponding to the 3D on-screen scene, and project and display the target rendering image | S130 |

FIG. 1

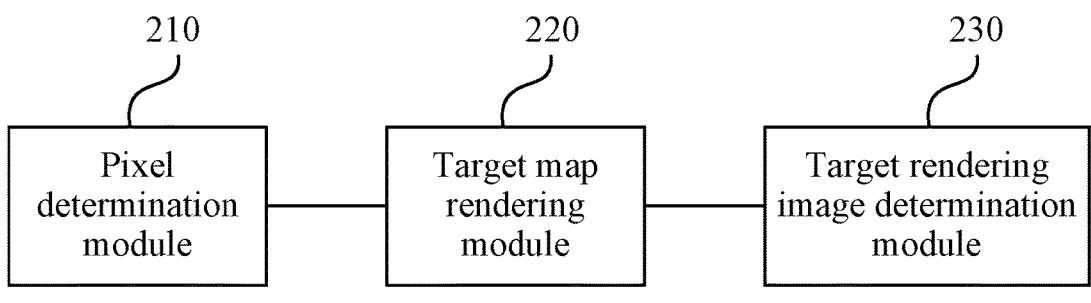

| 210 | 220 | 230 |
|-----|-----|-----|
| Pixel determination module | Target map rendering module | Target rendering image determination module |

FIG. 2

IMAGE RENDERING METHOD BASED ON 3D SCENE LAYER AND RENDER LAYER, ELECTRONIC DEVICE, AND STORAGE MEDIUM

CROSS-REFERENCE TO RELATED APPLICATION(S)

This is a national stage application filed under 37 U.S.C. 371 based on International Patent Application No. PCT/CN2022/127844, filed Oct. 27, 2022, which claims priority to Chinese Patent Application No. 202210474959.3 filed with the China National Intellectual Property Administration (CNIPA) on Apr. 29, 2022, the disclosures of which are incorporated herein by reference in their entireties.

The present application claims priority to Chinese Patent Application No. 202210474959.3 filed with the China National Intellectual Property Administration (CNIPA) on Apr. 29, 2022, the disclosure of which is incorporated herein by reference in its entirety.

TECHNICAL FIELD

The present disclosure relates to the field of image processing technology and, for example, to an image rendering method and apparatus, an electronic device, and a storage medium.

BACKGROUND

With the continuous development of image processing technology, an immersive environment combining the physical world with the virtual world, and supporting human-computer interaction has been generated based on extended reality technology and widely applied in all walks of life.

In the related art, in a rendering scene, the resolution of a scene layer (or a projection layer) needs to be less than the resolution of a display screen so as to improve the performance of rendering. A to-be-rendered map is rendered onto the scene layer first, and then is displayed on the screen. However, sampling is performed twice, resulting in a certain loss of definition. The definition of the rendered map is reduced.

SUMMARY

The present disclosure provides an image rendering method and apparatus, an electronic device, and a storage medium to reduce the complexity of the rendering process and improve the definition of a rendering image.

In a first aspect, the present disclosure provides an image rendering method. The method includes the steps described below.

A to-be-processed pixel in a three-dimensional (3D) scene layer, a target pixel in the 3D scene layer, a pixel attribute of the to-be-processed pixel, and a pixel attribute of the target pixel are determined according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map is rendered onto a render layer according to the map attribute of the target map.

A target rendering image corresponding to the 3D on-screen scene is determined based on the 3D scene layer and the render layer, and the target rendering image is projected and displayed.

In a second aspect, the present disclosure further provides an image rendering apparatus. The apparatus includes a pixel determination module, a target map rendering module, and a target rendering image determination module.

The pixel determination module is configured to determine a to-be-processed pixel in a 3D scene layer, a target pixel in the 3D scene layer, a pixel attribute of the to-be-processed pixel, and a pixel attribute of the target pixel according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map rendering module is configured to render the target map onto a render layer according to the map attribute of the target map.

The target rendering image determination module is configured to determine, based on the 3D scene layer and the render layer, a target rendering image corresponding to the 3D on-screen scene, and the target rendering image is projected and displayed.

In a third aspect, the present disclosure further provides an electronic device. The electronic device includes one or more processors and a storage apparatus configured to store one or more programs.

The one or more programs, when executed by the one or more processors, cause the one or more processors to perform the image rendering method according to any embodiment of the present disclosure.

In a fourth aspect, the present disclosure further provides a storage medium including computer-executable instructions. When the computer-executable instructions are executed by a computer processor, the image rendering method according to any embodiment of the present disclosure is performed.

BRIEF DESCRIPTION OF DRAWINGS

FIG. 1 is a flowchart of an image rendering method according to an embodiment of the present disclosure.

FIG. 2 is a diagram illustrating the structure of an image rendering apparatus according to an embodiment of the present disclosure.

DETAILED DESCRIPTION

Figure 3:
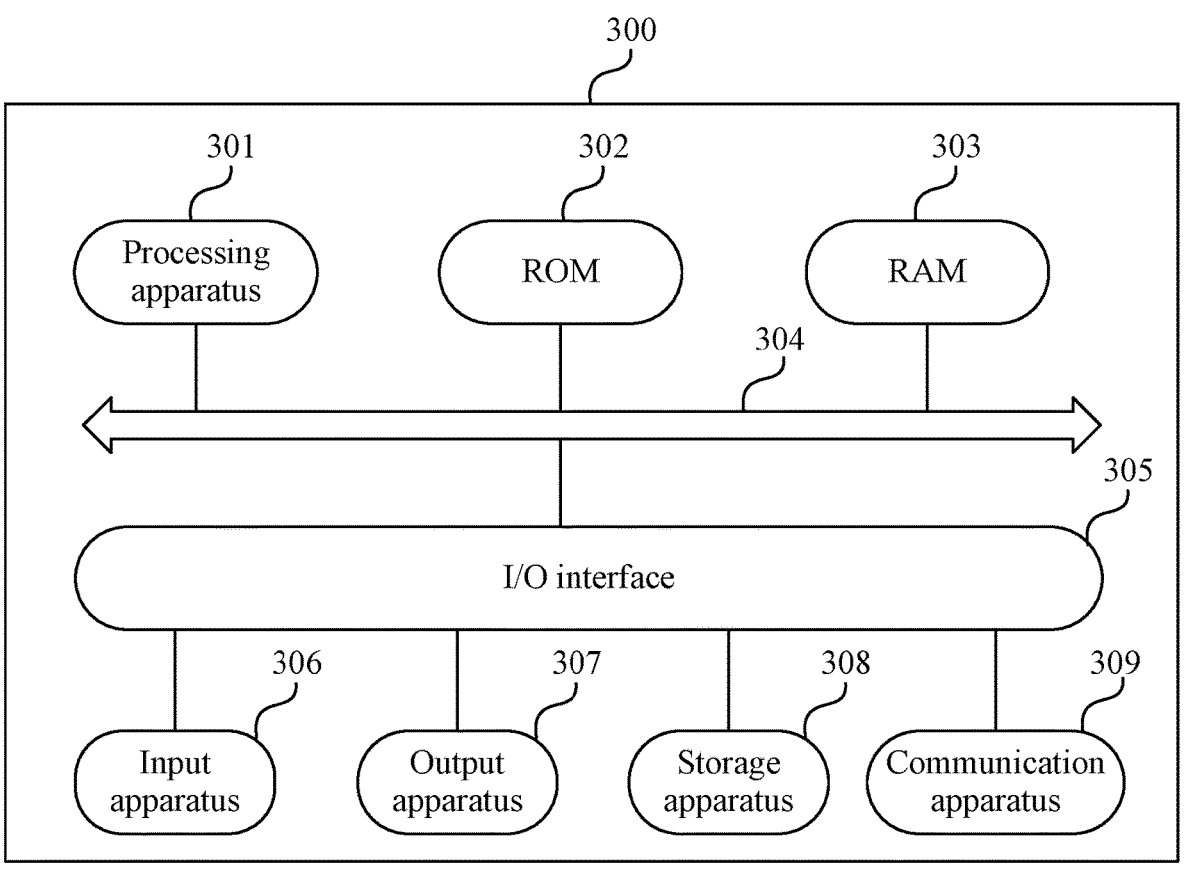
FIG. 3 is a diagram illustrating the structure of an electronic device according to an embodiment of the present disclosure.

Embodiments of the present disclosure are described hereinafter with reference to the drawings. Although some embodiments of the present disclosure are shown in the drawings, the present disclosure may be implemented in various forms. These embodiments are provided so that the present disclosure will be understood. It is to be understood that drawings and embodiments of the present disclosure are merely illustrative.

The various steps recited in method embodiments of the present disclosure may be performed in a different order, and/or in parallel. Additionally, the method embodiments may include an additional step and/or omit performing an illustrated step. The scope of the present disclosure is not limited in this respect.

As used herein, the term "comprise" and variations thereof are intended to be inclusive, that is, "including, but not limited to". The term "based on" refers to "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

References to "first", "second" and the like in the present disclosure are merely intended to distinguish one from another apparatus, module, or unit and are not intended to limit the order or interrelationship of the functions performed by the apparatus, module, or unit.

"One" and "a plurality" mentioned in the present disclosure are illustrative and not limiting, and that those skilled in the art should understand that "one" and "a plurality" are to be understood as "one or more" unless expressed in the context.

The names of messages or information exchanged between multiple apparatuses in embodiments of the present disclosure are only for illustrative purposes and are not intended to limit the scope of such messages or information.

Before the technical solutions are introduced, application scenes of embodiments of the present disclosure may be exemplified. The technical solutions are applicable to any application scenario where a 3D image or a 3D video needs to be displayed through a display device. For example, when a publicity image is displayed through an augmented reality screen set in a square with target information to be highlighted, the publicity image can be rendered through the technical solutions. The resolution of the target information part in the publicity image is increased to improve the definition of the target information in the publicity image. In the technical solutions provided in embodiments of the present disclosure, a projection display can be performed based on any display device below. For example, the display device may include at least one of a virtual reality (VR) device, an augmented reality (AR) device, a mixed reality (MR) device, or an extended reality (XR) device.

FIG. 1 is a flowchart of an image rendering method according to an embodiment of the present disclosure. The embodiment of the present disclosure is applicable to the case where image rendering is performed for a to-be-processed map to improve the definition of the to-be-processed map. The method may be performed by an image rendering apparatus. The apparatus may be implemented in the form of software and/or hardware.

As shown in FIG. 1, the method includes the steps described below:

In S110, a to-be-processed pixel in a 3D scene layer, a target pixel in the 3D scene layer, a pixel attribute of the to-be-processed pixel, and a pixel attribute of the target pixel are determined according to a map attribute of a to-be-processed map of a 3D on-screen scene, and a map attribute of a target map of the 3D on-screen scene.

It is to be noted that in a device implementing the function of augmented reality through extended reality (XR) technology, extended reality combines the real world with the virtual world through a computer to create a virtual environment supporting human-computer interaction. Virtual reality technology, augmented reality technology, and mixed reality technology are included. At least one layer, for example, a projection layer, a quad layer, and a cylinder layer, is supported when a display device displays an image corresponding to the scene on the screen. Different layers have different requirements. A projection layer is a 3D scene layer used for rendering a 3D scene in the manner of projection. A quad layer is a plane layer used for rendering a two-dimensional image in the manner of projection. A cylinder layer is a cylindrical layer used for rendering the cylinder of a 3D scene in the manner of projection. A color overlay is implemented between different layers in the manner of Alpha compositing. The display device displays corresponding layers successively according to the sequence of the received layer data.

The 3D on-screen scene is a scene used for a projection display. For example, the 3D on-screen scene may be a 3D landscape scene. When a projection display needs to be performed for the 3D landscape scene, the 3D landscape scene may be displayed in a display interface. The 3D on-screen scene may be a 3D game animation scene. A projection display needs to be performed for the 3D game animation scene so that a game situation can be felt more realistically in the display interface. Each 3D on-screen scene corresponds to one 3D mesh model. It may be understood that the scene information in the 3D on-screen scene is reflected through a constructed 3D mesh model. The 3D mesh model has a plurality of meshes. Each mesh corresponds to one map. A map may be either rectangular or triangular. Maps include to-be-processed maps and target maps. Each mesh in the 3D mesh model corresponds to one map. A map corresponding to a mesh to be displayed in high definition is determined as the target map. A map corresponding to a remaining mesh is determined as the to-be-processed map. That is, the to-be-processed map is a map displayed in an originally normal manner with no need for increasing resolution, and the target map is a map to be displayed with the resolution increased. The target map corresponds to a region highlighted in the 3D on-screen scene. The 3D scene layer is a projection layer including the to-be-processed map and the target map before being rendered.

In the embodiment of the present disclosure, a map attribute may include texture coordinates of a map and an identifier of the map. A pixel attribute includes a red-green-blue (RGB) value of a pixel and a transparency value of the pixel. Texture coordinates of the to-be-processed map in the 3D on-screen scene, and texture coordinates of the target map in the 3D on-screen scene may be determined through the map attribute of the to-be-processed map, and the map attribute of the target map. An RGB value and transparency value of a pixel in the display interface and corresponding to the target map, and an RGB value and transparency value of a pixel in the display interface and corresponding to the target map may be determined through pixel attributes.

The to-be-processed pixel corresponds to the to-be-processed map. The target pixel corresponds to the target map. Texture coordinates of a map may be spatially transformed according to texture coordinates in a map attribute, and a preset spatial transformation manner so that at least one pixel in the display interface and corresponding to a point on the map is determined. Exemplarily, a vertex pixel in the display interface and corresponding to each vertex on the map may be determined based on the texture coordinates and spatial transformation manner of the map. Moreover, interpolation processing is performed based on multiple vertex pixels so as to determine other pixels in the display interface and corresponding to the map. On this basis, the to-be-processed pixel corresponding to the to-be-processed map and the target pixel corresponding to the target map may be determined. Alternatively, pixels in the display interface and corresponding to all points on the map may be determined based on the texture coordinates and the spatial transformation manner. On this basis, the to-be-processed pixel corresponding to the to-be-processed map and the target pixel corresponding to the target map are determined.

In the embodiment of the present disclosure, the 3D scene layer may be acquired according to the determined to-be-processed pixel, the determined target pixel, the determined pixel attribute of the to-be-processed pixel, and the determined pixel attribute of the target pixel so that a target rendering image corresponding to the 3D on-screen scene is determined according to the 3D scene layer and a render layer in the subsequent steps.

In the embodiment of the present disclosure, before the to-be-processed pixel in the 3D scene layer and the target pixel in the 3D scene layer are determined, the method further includes that the target map in a mesh model, and the map attribute of the target map are determined according to a target display region in the 3D on-screen scene.

The 3D on-screen scene may be a scene where a three-dimensional display is needed, for example, a scene where an industrial machinery component needs to be displayed in a three-dimensional form, or a scene for displaying a 3D movie, or a scene where a special-effect video needs to be displayed in a 3D form. The 3D mesh model is a model corresponding to the 3D on-screen scene and may be composed of a plurality of meshes. Each mesh may be attached with a corresponding patch and may correspond to one patch. The mesh model may include at least one patch. Exemplarily, each patch is composed of two triangles. Correspondingly, one patch includes six vertices, a front face, and a back face. The front face of the patch and the back face of the patch each include three vertices.

Specifically, when the mesh model is constructed, each patch in the mesh model may be marked, for example, through a patch identifier and/or through the texture information marking a patch vertex. One or more patches included in the corresponding target display region are determined based on the patch marking information and the display requirements in the display interface. A map composed of the determined one or more patches is taken as the target map. Moreover, the map attribute of the target map is determined based on an attribute of a patch included in the target display region. In the embodiment of the present disclosure, the target map to be displayed in high definition can be determined rapidly and effectively through the target display region.

In the embodiment of the present disclosure, the step in which the target map in the mesh model, and the map attribute of the target map are determined according to the target display region in the 3D on-screen scene includes that at least one patch identifier corresponding to the target display region in the mesh model is determined and that the target map and the map attribute are determined according to each patch identifier and map texture coordinates corresponding to each patch identifier.

A patch identifier is used for distinguishing different patches in the mesh model and may include at least one of a number identifier, a symbol identifier, a letter identifier, or a text identifier. A map attribute refers to map texture coordinates of at least one patch, that is, UV coordinates. When the UV coordinates serve as two-dimensional texture coordinates of a vertex of the polygonal mesh, a two-dimensional texture coordinate system is defined. The coordinate system is UV texture space. In this space, U and V are used for defining coordinate axes so as to determine how a texture image is placed on a 3D model surface. That is, the UV coordinates provide a connection between the model surface and the texture image and take charge for determining a vertex on the model surface and on which a pixel on the texture image should be placed. In this case, the entire texture can be spread onto the model. On this basis, when the at least one patch identifier corresponding to the target display region in the mesh model is determined, the target map is determined by at least one patch corresponding to the at least one patch identifier. Correspondingly, the map texture coordinates of the target map are determined.

Moreover, the map texture coordinates are determined as the map attribute. It can be seen that the set patch identifier or patch texture coordinates help determine the target map in the mesh model accurately and efficiently and thus help render the target map onto a render layer based on the map attribute subsequently.

In the embodiment of the present disclosure, a pixel attribute includes an RGB value and a transparency value. The color corresponding to a pixel in the 3D scene layer is determined through the RGB value. The transparency of the pixel in the 3D scene layer is determined through the transparency value.

The embodiment in which the to-be-processed pixel in the 3D scene layer, the target pixel in the 3D scene layer, the pixel attribute of the to-be-processed pixel, and the pixel attribute of the target pixel are determined according to the map attribute of the to-be-processed map of the 3D on-screen scene, and the map attribute of the target map of the 3D on-screen scene includes that map texture coordinates of the to-be-processed map written in an assembly, map texture coordinates of the target map written in the assembly, and a transformation matrix written in the assembly are acquired based on a vertex shader, that the to-be-processed pixel of the 3D on-screen scene in the 3D scene layer and the target pixel of the 3D on-screen scene in the 3D scene layer are determined, that the determined to-be-processed map and the determined target pixel is rendered based on an RGB value of the determined to-be-processed pixel and an RGB value of the target pixel, and that a transparency value of the target pixel is rendered into a target transparency value based on a target pixel shader.

In the embodiment of the present disclosure, the 3D scene layer is determined based on all to-be-processed pixels rendered based on the RGB value, and all target pixels rendered based on the RGB value and the transparency value.

Map texture coordinates are texture coordinates of a map in the 3D scene layer, that is, including the texture coordinates of the to-be-processed map, and the texture coordinates of the target map. The transformation matrix includes a matrix reflecting the correspondence between multiple pixels of the target map, and multiple pixels of the target map rendered onto the render layer. The transformation matrix includes a rotation matrix and a translation matrix.

The vertex shader may be used for determining a map attribute, replacing a programmable program of a fixed pipeline, and being mainly responsible for geometric operations of multiple pixels in the model. Only one vertex shader can be activated at a time. The vertex shader runs based on a graphics processing unit (GPU). When the GPU receives an acquisition instruction for acquiring the information in the assembly, the GPU calls the vertex shader to run to acquire the map texture coordinates of the written to-be-processed map and the map texture coordinates of the written target map. Details are not repeated here in the embodiment of the present disclosure.

In an embodiment, in order to facilitate subsequent rendering and the determination of a map position, the map texture coordinates and the transformation matrix may be prewritten into the assembly, and corresponding content is acquired from the assembly based on the shader to perform rendering. For example, the transformation matrix written in the assembly may be acquired directly based on the vertex shader.

In the embodiment of the present disclosure, a specific implementation in which the to-be-processed pixel of the 3D on-screen scene in the 3D scene layer, and the target pixel of the 3D on-screen scene in the 3D scene layer are determined may be as follows: The to-be-processed pixel of the 3D on-screen scene in the 3D scene layer is determined based on the map texture coordinates of the determined to-be-processed map, and the target pixel of the 3D on-screen scene in the 3D scene layer is determined based on the map texture coordinates of the determined target map. At least one pixel in the range of the map texture coordinates of the to-be-processed map may be determined as a to-be-processed pixel and that at least one pixel in the range of the map texture coordinates of the target map may be determined as a target pixel.

In an embodiment, a to-be-processed RGB value of the to-be-processed pixel in the 3D scene layer, and a target RGB value of the target pixel in the 3D scene layer may be determined separately based on a pixel attribute. Because only the resolution of the target map changes in the rendering process, the color of the to-be-processed map and the color of the target map are not affected. Therefore, the to-be-processed pixel may be rendered based on the to-be-processed RGB value in the 3D scene layer, and the target pixel may be rendered based on the target RGB value in the 3D scene layer, so that the color of a map before and after being rendered keeps consistent.

In order to display the target map in the manner of transparent transmission to reduce the loss of definition, a transparency value of the target map may be rendered. The transparency value of the target pixel may be rendered into the target transparency value based on the target pixel shader. The target pixel shader is used for adjusting the RGB value of the pixel and/or the transparency value of the pixel. The RGB value of the pixel and/or the transparency value of the pixel may be set by adjusting a set RGB parameter in the target pixel shader and/or a set transparency parameter in the target pixel shader. For example, the target transparency value may be set to be smaller than the original transparency value of the target pixel in the 3D scene layer. The smaller the transparency value, the greater transparent the pixel. The effect of the target map in the 3D scene layer on the definition of the displayed target rendering image is reduced by increasing the transparency of the target pixel.

Exemplarily, the transparency value may be in the range of $[0, 1]$. The original transparency value of the target pixel in the 3D scene layer is set to a. Then the target transparency value may be 1−a. For example, a is 1, and then the target transparency value is 0; that is, the rendered target map is completely transparent. The target transparency value may also be set to any value less than a so as to reduce the effect of the target map in the 3D scene layer on the definition of the displayed target rendering image, thereby making the rendered target map translucent.

In the embodiment of the present disclosure, the map position is determined effectively through the written map texture coordinates and transformation matrix. Moreover, the transparency value of the target map is rendered so that the target map is displayed in the manner of transparent transmission, reducing the loss of definition and further highlighting the content in the target map.

In S120, the target map is rendered onto the render layer according to the map attribute of the target map.

The render layer may be a blank layer that matches the 3D scene layer. The map attribute includes, for example, texture coordinates, map RGB information, and map transparency information. The step in which the target map is rendered onto the render layer includes that the target map is rendered to corresponding coordinates of the render layer; and that at least one of the RGB value of the target map or the transparency value of the target map is rendered to the render layer. After the target map is rendered onto the render layer, the render layer includes the target map.

In an embodiment, the step in which the target map is rendered onto the render layer according to the map attribute of the target map includes that a target display position of the target map on the render layer is determined according to the map texture coordinates of the target map and the transformation matrix, and that the target map is rendered onto the render layer based on the target display position and a rendering transparency value of the target map.

The target display position may be a display position of the target map on the render layer. The rendering transparency value is a transparency value of a target map when being displayed on the render layer.

In an embodiment, the step in which the target display position of the target map on the render layer is determined according to the map texture coordinates of the target map and the transformation matrix includes that texture coordinates of each target pixel are determined based on the map texture coordinates, that a coordinate transformation operation is performed for the texture coordinates of each target pixel according to the transformation matrix to obtain rendering coordinates on the render layer and corresponding to each target pixel, and that the target display position is determined according to a plurality of rendering coordinates. Alternatively, a vertex pixel corresponding to a vertex position of the target map is determined among each target pixel. A coordinate transformation operation is performed for vertex texture coordinates of the vertex pixel according to the transformation matrix to obtain vertex rendering coordinates of the target map rendered on the render layer. A region composed of a plurality of vertex rendering coordinates is determined as the target display position.

The transparency of the target map may be adjusted according to the rendering transparency value of the target map. Moreover, the target map obtained after adjustment is rendered onto the layer. The rendering transparency value of the target map is composed of a pixel rendering transparency value of a plurality of target pixels. Different pixel transparency values may be set for different target pixels of the target map so that the target map is displayed differentially according to the difference in a data transparency value when the target map is displayed according to pixel rendering transparency, helping highlight information in the target map.

Exemplarily, the rendering transparency value may be set to a value indicating non-transparency or may be set to be greater than a preset threshold. For example, when the transparency value is in the range of [0, 1], the rendering transparency may be set to 1, which fully reflects the effect of the target map in the render layer and with the resolution increased. Alternatively, the preset threshold may be 0.5 so that the target map is translucent after being rendered onto the render layer. To further emphasize the target map displayed through the render layer, the rendering transparency value may be set to a value greater than the target transparency value.

In the embodiment of the present disclosure, the corresponding target display position is determined after the map texture coordinates of the target map are rendered onto the render layer, thereby enabling the target map to be rendered onto the render layer accurately according to the target display position. Moreover, with the rendering transparency value, the target map is displayed in the manner of transparent transmission, reducing the loss of definition and further highlighting the content in the target map.

In the embodiment of the present disclosure, the target map corresponds to a region highlighted in the 3D on-screen scene. The render layer is used for increasing the resolution of the target map in the display interface. After the target map is rendered onto the render layer, the resolution of the target map is greater than the resolution of the to-be-processed map. In this case, when the to-be-processed map and the target map are displayed simultaneously, the information displayed in the target map is further highlighted, implementing the resolution of the target display region in the display interface and achieving the effect of improving the view display.

In S130, a target rendering image corresponding to the 3D on-screen scene is determined based on the 3D scene layer and the render layer, and the target rendering image is projected and displayed.

The target rendering image may be an image obtained by overlaying the 3D scene layer with the render layer, and is composed of an image corresponding to part of the to-be-processed map and an image corresponding to part of the rendered target map. The target rendering image matches the image displayed through the 3D on-screen scene.

A to-be-processed image in the 3D scene layer may be combined with the rendered target map in the render layer to generate the target rendering image corresponding to the 3D on-screen scene. The target rendering image is projected to the display interface so that the target rendering image is displayed in the display interface. Exemplarily, a manner of combining the to-be-processed image with the rendered target map may include that the 3D scene layer and the render layer are overlaid according to a correspondence between layer positions, and that the display effect of the determined target rendering image is adjusted by adjusting the transparency of the to-be-processed image in the 3D scene layer and/or the transparency of the target map in the render layer.

In the embodiment of the present disclosure, the step in which the target rendering image is determined based on the 3D scene layer and the render layer includes that the target rendering image is determined based on the display content on the 3D scene layer, the target transparency value of the target pixel, and a rendering transparency value corresponding to a target rendering map in the render layer.

The rendering transparency value is different from the target transparency value. To further emphasize the target map displayed through the render layer, the rendering transparency value may be set to a value greater than the target transparency value. Based on the preceding description, the display content on the 3D scene layer may include a target patch after the to-be-processed patch and the pixel transparency are adjusted.

An operation of determining the target rendering image includes that the display content on the 3D scene layer is overlaid with the target rendering map in the render layer based on the target transparency value of the target pixel and the rendering transparency value of the target pixel and that the image obtained through an overlay is determined the as target rendering image. One render layer is generated to correspond to the display content in each 3D scene layer. Texture coordinates of a target patch in the 3D scene layer correspond to texture coordinates of a target patch in the render layer. When the 3D scene layer is overlaid with the render layer, the target rendering image is displayed.

In the embodiment of the present disclosure, the 3D scene layer may be overlaid with the render layer according to a pre-input sequence. For example, the pre-input sequence may be an overlaying sequence in which the render layer is placed before or after the 3D scene layer. Alternatively, the pre-input sequence may be an overlaying sequence in which the render layer is adjacent to or spaced from the 3D scene layer. In an embodiment, to highlight the effect of the target map in the render layer and with the resolution adjusted, an overlay may be performed according to a sequence in which the render layer precedes the 3D scene layer. That is, the render layer is placed before the 3D scene layer. Thus the information of the target map in the render layer and with the resolution increased is further highlighted. According to the embodiment of the present disclosure, the target rendering image can be obtained by combining the display content on the 3D scene layer, with the target rendering map in the rendering layer, thereby improving the definition of rendering and reducing the complexity of the rendering process.

According to the technical solutions provided in embodiments of the present disclosure, a to-be-processed pixel in a 3D scene layer, a target pixel in the 3D scene layer, a pixel attribute of the to-be-processed pixel, and a pixel attribute of the target pixel can be determined according to a map attribute of a to-be-processed map of a 3D on-screen scene, and a map attribute of a target map of the 3D on-screen scene. That is, a correspondence between the to-be-processed pixel and the to-be-processed map and a correspondence between the target pixel and the target map are obtained. The target map is rendered onto a render layer according to the map attribute of the target map. A target rendering image is determined based on the 3D scene layer and the render layer. With the adoption of transparent transmission, it is unnecessary to render a map onto a 3D scene layer in the rendering process, solving a problem in the related art that a relatively low resolution of display content results in a poor display effect when a 3D scene is displayed based on the 3D scene layer. It implements the technical effect that, under the premise of not reducing the rendering efficiency, a target display region that needs to be highlighted is transparently transmitted and displayed in the render layer so as to improve the resolution of the target display region.

FIG. 2 is a diagram illustrating the structure of an image rendering apparatus according to an embodiment of the present disclosure. As shown in FIG. 2, the apparatus includes a pixel determination module 210, a target map rendering module 220, and a target rendering image determination module 230.

The pixel determination module 210 is configured to determine a to-be-processed pixel in a 3D scene layer, a target pixel in the 3D scene layer, a pixel attribute of the to-be-processed pixel, and a pixel attribute of the target pixel according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map rendering module 220 is configured to render the target map onto a render layer according to the map attribute of the target map.

The target rendering image determination module 230 is configured to determine a target rendering image based on the 3D scene layer and the render layer.

On the basis of the preceding technical solutions, the apparatus further includes a map attribute determination module.

The map attribute determination module is configured to determine the target map in a mesh model, and the map attribute of the target map according to a target display region in the 3D on-screen scene.

On the basis of the preceding technical solutions, the map attribute determination module includes a patch identifier determination unit and a map attribute determination unit.

The patch identifier determination unit is configured to determine at least one patch identifier corresponding to the target display region in the mesh model.

The map attribute determination unit is configured to determine the target map and the map attribute according to each patch identifier and map texture coordinates corresponding to each patch identifier.

On the basis of the preceding technical solutions, a pixel attribute includes an RGB value and a transparency value. The pixel determination module 210 includes a map texture coordinate reading unit and a target pixel rendering unit.

The map texture coordinate reading unit is configured to acquire, based on a vertex shader, map texture coordinates of the to-be-processed map written in an assembly, map texture coordinates of the target map written in the assembly, and a transformation matrix written in the assembly, and determine the to-be-processed pixel of the 3D on-screen scene in the 3D scene layer and the target pixel of the 3D on-screen scene in the 3D scene layer. The transformation matrix includes a rotation matrix and a translation matrix.

The target pixel rendering unit is configured to render the determined to-be-processed pixel and the determined target pixel based on an RGB value of the determined to-be-processed pixel and an RGB value of the determined target pixel and render a transparency value of the target pixel into a target transparency value based on a target pixel shader.

On the basis of the preceding technical solutions, the target map rendering module 220 includes a target display position determination unit and a target map rendering unit.

The target display position determination unit is configured to determine a target display position of the target map on the render layer according to map texture coordinates of the target map and a transformation matrix.

The target map rendering unit is configured to render the target map onto the render layer based on the target display position and a rendering transparency value of the target map.

On the basis of the preceding technical solutions, the target rendering image determination module 230 includes a target rendering image determination unit.

The target rendering image determination unit is configured to determine the target rendering image based on the display content on the 3D scene layer, the target transparency value of the target pixel, and a rendering transparency value corresponding to a target rendering map in the render layer.

The rendering transparency value is different from the target transparency value.

On the basis of the preceding technical solutions, the target map corresponds to a region highlighted in the 3D on-screen scene. The render layer is used for increasing the resolution of the target map in a display interface.

According to the technical solutions provided in embodiments of the present disclosure, a to-be-processed pixel in a 3D scene layer, a target pixel in the 3D scene layer, a pixel attribute of the to-be-processed pixel, and a pixel attribute of the target pixel can be determined according to a map attribute of a to-be-processed map of a 3D on-screen scene, and a map attribute of a target map of the 3D on-screen scene. That is, a correspondence between the to-be-processed pixel and the to-be-processed map and a correspondence between the target pixel and the target map are obtained. The target map is rendered onto a render layer according to the map attribute of the target map. A target rendering image is determined based on the 3D scene layer and the render layer. With the adoption of transparent transmission, it is unnecessary to render a map onto a 3D scene layer in the rendering process, solving a problem in the related art that a relatively low resolution of display content results in a poor display effect when a 3D scene is displayed based on the 3D scene layer. It implements the technical effect that, under the premise of not reducing the rendering efficiency, a target display region that needs to be highlighted can be transparently transmitted and displayed in the render layer so as to improve the resolution of the target display region. The image rendering apparatus provided in the embodiment of the present disclosure may perform the image rendering method provided in any embodiment of the present disclosure and has function modules and effects corresponding to the method performed.

A plurality of units and modules included in the preceding apparatus are divided according to function logic, and these units and modules may also be divided in other manners as long as the corresponding functions can be achieved. Moreover, names of a plurality of function units are used for distinguishing between each other and are not intended to limit the scope of embodiments of the present disclosure.

FIG. 3 is a diagram illustrating the structure of an electronic device according to an embodiment of the present disclosure. FIG. 3 shows a diagram illustrating the structure of an electronic device 300 (such as a terminal device or server in FIG. 3) applicable to implementing an embodiment of the present disclosure. A terminal device in embodiments of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal) and stationary terminals such as a digital television (TV) and a desktop computer. The electronic device 300 shown in FIG. 3 is merely an example and is not intended to limit the function and usage scope of embodiments of the present disclosure.

As shown in FIG. 3, the electronic device 300 may include a processing apparatus 301 (such as a central processing unit and a graphics processing unit). The processing apparatus 301 may perform multiple types of appropriate operations and processing based on a program stored in a read-only memory (ROM) 302 or a program loaded from a storage apparatus 308 to a random-access memory (RAM) 303. A plurality of programs and data required for the operation of the electronic device 300 are also stored in the RAM 303. The processing apparatus 301, the ROM 302, and the RAM 303 are connected to each other through a bus 304. An input/output (I/O) interface 305 is also connected to the bus 304.

Generally, the following apparatus may be connected to the I/O interface 305: an input apparatus 306 such as a touch screen, a touch pad, a keyboard, a mouse, a camera, a microphone, an accelerometer, and a gyroscope; an output apparatus 307 such as a liquid crystal display (LCD), a speaker, and a vibrator; the storage apparatus 308 such as a magnetic tape and a hard disk; and a communication apparatus 309. The communication apparatus 309 may allow the electronic device 300 to perform wireless or wired communication with other devices to exchange data. Although FIG. 3 shows the electronic device 300 having a plurality of apparatuses, all of the apparatuses shown herein need not be implemented or present. Alternatively, more or fewer apparatuses may be implemented or present.

According to embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 309, or may be installed from the storage apparatus 308, or may be installed from the ROM 302. When the computer program is executed by the one or more processing apparatuses 301, the preceding functions defined in the methods of embodiments of the present disclosure are performed.

The names of messages or information exchanged between multiple apparatuses in embodiments of the present disclosure are only for illustrative purposes and are not intended to limit the scope of such messages or information.

The electronic device provided in the embodiment of the present disclosure and the image rendering method provided in the preceding embodiments belong to the same concept. For technical details not described in detail in the embodiment of the present disclosure, reference may be made to the preceding embodiments. The embodiment has the same effects as the preceding embodiments.

An embodiment of the present disclosure provides a computer storage medium storing a computer program which, when executed by a processor, causes the processor to perform the image rendering method provided in the preceding embodiments.

The preceding computer-readable medium in the present disclosure may be a computer-readable signal medium or a computer-readable storage medium or any combination thereof. The computer-readable storage medium, for example, may be, but is not limited to, an electrical, magnetic, optical, electromagnetic, infrared, or semiconductor system, apparatus, or device, or any combination thereof. Examples of the computer-readable storage medium may include, but are not limited to, an electrical connection with one or more wires, a portable computer magnetic disk, a hard disk, a RAM, a ROM, an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by an instruction execution system, apparatus or device or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms, including, but not limited to, an electromagnetic signal, an optical signal, or any suitable combination thereof. The computer-readable signal medium may also be any computer-readable medium except the computer-readable storage medium. The computer-readable signal medium may send, propagate or transmit a program used by an instruction execution system, apparatus or device or used in conjunction with an instruction execution system, apparatus or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any currently known or future developed network protocol, such as the HyperText Transfer Protocol (HTTP), and may be interconnected with any form or medium of digital data communication (such as a communication network). Examples of the communication network include a LAN, a WAN, an internet (such as the Internet) and a peer-to-peer network (such as an ad hoc network), as well as any currently known or future developed network.

The preceding computer-readable medium may be included in the preceding electronic device or may exist alone without being assembled into the electronic device.

The computer-readable medium carries one or more programs which, when executed by the electronic device, cause the electronic device to perform the steps described below:

A to-be-processed pixel in a 3D scene layer, a target pixel in the 3D scene layer, a pixel attribute of the to-be-processed pixel, and a pixel attribute of the target pixel are determined according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map is rendered onto a render layer according to the map attribute of the target map.

A target rendering image is determined based on the 3D scene layer and the render layer.

Computer program codes for executing operations in the present disclosure may be written in one or more programming languages or a combination thereof. The preceding programming languages include, but are not limited to, object-oriented programming languages such as Java, Smalltalk, and C++ and may also include conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a LAN or a WAN, or may be connected to an external computer (for example, via the Internet through an Internet service provider).

Flowcharts and block diagrams among the drawings illustrate architectures, functions, and operations possible to implement in accordance with the system, method, and computer program product in a plurality of embodiments of the present disclosure. In this regard, each block in the flowcharts or block diagrams may represent a module, a program segment, or part of codes that contains one or more executable instructions for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The involved units described in the embodiments of the present disclosure may be implemented by software or hardware. The names of the units in one case do not constitute a limitation on the units themselves. For example, a first acquisition unit may also be described as "a unit for acquiring at least two Internet protocol addresses".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program used by an instruction execution system, apparatus or device or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. Examples of the machine-readable storage medium may include an electrical connection based on one or more wires, a portable computer disk, a hard disk, a RAM, a ROM, a EPROM or a flash memory, an optical fiber, a CD-ROM, an optical storage device, a magnetic storage device, or any appropriate combination thereof.

According to one or more embodiments of the present disclosure, example one provides an image rendering method. The method includes the steps described below.

A to-be-processed pixel in a 3D scene layer, a target pixel in the 3D scene layer, a pixel attribute of the to-be-processed pixel, and a pixel attribute of the target pixel are determined according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map is rendered onto a render layer according to the map attribute of the target map.

A target rendering image is determined based on the 3D scene layer and the render layer.

According to one or more embodiments of the present disclosure, example two provides an image rendering method. The method further includes the step described below.

The target map in a mesh model, and the map attribute of the target map is determined according to a target display region in the 3D on-screen scene.

According to one or more embodiments of the present disclosure, example three provides an image rendering method. The method further includes the steps described below.

At least one patch identifier corresponding to the target display region in the mesh model is determined.

The target map and the map attribute are determined according to each patch identifier and map texture coordinates corresponding to each patch identifier.

According to one or more embodiments of the present disclosure, example four provides an image rendering method. A pixel attribute includes an RGB value and a transparency value. The method further includes the steps described below.

Map texture coordinates of the to-be-processed map written in an assembly, map texture coordinates of the target map written in the assembly, and a transformation matrix written in the assembly are acquired based on a vertex shader. The to-be-processed pixel of the 3D on-screen scene in the 3D scene layer, and the target pixel of the 3D on-screen scene in the 3D scene layer are determined. The transformation matrix includes a rotation matrix and a translation matrix.

The determined to-be-processed pixel and the determined target pixel are rendered based on an RGB value of the determined to-be-processed pixel and an RGB value of the determined target pixel, and a transparency value of the target pixel is rendered into a target transparency value based on a target pixel shader.

According to one or more embodiments of the present disclosure, example five provides an image rendering method. The method further includes the steps described below.

A target display position of the target map on the render layer is determined according to map texture coordinates of the target map and a transformation matrix.

The target map is rendered onto the render layer based on the target display position and a rendering transparency value of the target map.

According to one or more embodiments of the present disclosure, example six provides an image rendering method. The method further includes the step described below.

The target rendering image is determined based on the display content on the 3D scene layer, the target transparency value of the target pixel, and a rendering transparency value corresponding to a target rendering map in the render layer.

The rendering transparency value is different from the target transparency value.

According to one or more embodiments of the present disclosure, example seven provides an image rendering method. The method further includes the aspect described below.

The target map corresponds to a region highlighted in the 3D on-screen scene. The render layer is used for increasing the resolution of the target map in a display interface.

According to one or more embodiments of the present disclosure, example eight provides an image rendering apparatus. The apparatus includes a pixel determination module, a target map rendering module, and a target rendering image determination module.

The pixel determination module is configured to determine a to-be-processed pixel in a 3D scene layer, a target pixel in the 3D scene layer, a pixel attribute of the to-be-processed pixel, and a pixel attribute of the target pixel according to a map attribute of a to-be-processed map of a 3D on-screen scene, and a map attribute of a target map of the 3D on-screen scene. The to-be-processed pixel corresponds to the to-be-processed map. The target pixel corresponds to the target map.

The target map rendering module is configured to render the target map onto a render layer according to the map attribute of the target map.

The target rendering image determination module is configured to determine a target rendering image based on the 3D scene layer and the render layer.

Additionally, although a plurality of operations are depicted in a particular order, this should not be construed as that these operations are required to be performed in the particular order shown or in a sequential order. In certain circumstances, multitasking and parallel processing may be advantageous. Similarly, although a plurality of implementation details are included in the preceding discussion, these should not be construed as limiting the scope of the present disclosure. Some features described in the context of separate embodiments may also be implemented in combination in a single embodiment. Conversely, a plurality of features described in the context of a single embodiment may also be implemented in multiple embodiments individually or in any suitable sub-combination.

What is claimed is:

1. An image rendering method, comprising:
determining a first pixel in a three dimensional (3D) scene layer, a second pixel in the 3D scene layer, a pixel attribute of the first pixel, and a pixel attribute of the second pixel according to a map attribute of a first map of a 3D on-screen scene, and a map attribute of a second map of the 3D on-screen scene, wherein the first pixel corresponds to the first map, and the second pixel corresponds to the second map; wherein the 3D scene layer is a copy of the 3D on-screen scene and comprises the first map and the second map;
rendering the second map onto a render layer according to the map attribute of the second map; wherein the render layer before being rendered is a blank layer that is of a same size and spatially aligned to the 3D scene layer, and is used to increase a resolution of the second map in a display interface; and
obtaining a rendering image that corresponds to the 3D on-screen scene by overlapping the 3D scene layer and the render layer, and displaying the rendering image in the display interface.

2. The method of claim 1, wherein each of the pixel attribute of the first pixel and the pixel attribute of the second pixel comprises a red-green-blue (RGB) value and a transparency value; and determining the first pixel in the 3D scene layer, the second pixel in the 3D scene layer, the pixel attribute of the first pixel and the pixel attribute of the second pixel according to the map attribute of the first map of the 3D on-screen scene, and the map attribute of the second map of the 3D on-screen scene comprises:
acquiring, based on a vertex shader, map texture coordinates of the first map, map texture coordinates of the second map, and a transformation matrix, and determining the first pixel of the 3D on-screen scene in the 3D scene layer, and the second pixel of the 3D on-screen scene in the 3D scene layer, wherein the transformation matrix comprises a rotation matrix and a translation matrix; and
rendering a determined first pixel and a determined second pixel based on an RGB value of the determined first pixel and an RGB value of the determined second pixel, and rendering a transparency value of the second pixel into a first transparency value based on a pixel shader.

3. The method of claim 1, wherein rendering the second map onto the render layer according to the map attribute of the second map comprises:
determining a display position of the second map on the render layer according to map texture coordinates of the second map and a transformation matrix; and rendering the second map onto the render layer based on the display position and a second transparency value of the second map.

4. The method of claim 1, wherein obtaining the rendering image that corresponds to the 3D on-screen scene by overlapping the 3D scene layer and the render layer comprises:
determining, based on display content on the 3D scene layer, a first transparency value of the second pixel, and a second transparency value corresponding to a rendering map in the render layer, the rendering image corresponding to the 3D on-screen scene,
wherein the second transparency value is different from the first transparency value.

5. The method of claim 1, wherein the second map corresponds to a region highlighted in the 3D on-screen scene.

6. The method of claim 2, wherein the second map corresponds to a region highlighted in the 3D on-screen scene.

7. The method of claim 3, wherein the second map corresponds to a region highlighted in the 3D on-screen scene.

8. The method of claim 4, wherein the second map corresponds to a region highlighted in the 3D on-screen scene.

9. An electronic device, comprising:
at least one processor, and
a storage apparatus configured to store at least one program,
wherein the at least one program, when executed by the at least one processor, causes the at least one processor to perform an image rendering method,
wherein the image rendering method comprises:
determining a first pixel in a 3D scene layer, a second pixel in the 3D scene layer, a pixel attribute of the first pixel, and a pixel attribute of the second pixel according to a map attribute of a first map of a 3D on-screen scene, and a map attribute of a second map of the 3D on-screen scene, wherein the first pixel corresponds to the first map, and the second pixel corresponds to the second map; wherein the 3D scene layer is a copy of the 3D on-screen scene and comprises the first map and the second map;
rendering the second map onto a render layer according to the map attribute of the second map; wherein the render layer before being rendered is a blank layer that is of a same size and spatially aligned to the 3D scene layer, and is used to increase a resolution of the second map in a display interface; and
obtaining a rendering image that corresponds to the 3D on-screen scene by overlapping the 3D scene layer and the render layer, and displaying the rendering image in the display interface.

10. The electronic device of claim 9, wherein each of the pixel attribute of the first pixel and the pixel attribute of the second pixel comprises a red-green-blue (RGB) value and a transparency value; and determining the first pixel in the 3D scene layer, the second pixel in the 3D scene layer, the pixel attribute of the first pixel and the pixel attribute of the second pixel according to the map attribute of the first map of the 3D on-screen scene, and the map attribute of the second map of the 3D on-screen scene comprises:
acquiring, based on a vertex shader, map texture coordinates of the first map, map texture coordinates of the second map, and a transformation matrix, and determining the first pixel of the 3D on-screen scene in the 3D scene layer, and the second pixel of the 3D on-screen scene in the 3D scene layer, wherein the transformation matrix comprises a rotation matrix and a translation matrix; and rendering a determined first pixel and a determined second pixel based on an RGB value of the determined first pixel and an RGB value of the determined second pixel, and rendering a transparency value of the second pixel into a first transparency value based on a pixel shader.

11. The electronic device of claim 9, wherein rendering the second map onto the render layer according to the map attribute of the second map comprises:

determining a display position of the second map on the render layer according to map texture coordinates of the second map and a transformation matrix; and rendering the second map onto the render layer based on the display position and a second transparency value of the second map.

12. A non-transitory storage medium comprising computer-executable instructions, wherein when the computer-executable instructions are executed by a computer processor, an image rendering method, wherein the image rendering method comprises:

determining a first pixel in a 3D scene layer, a second pixel in the 3D scene layer, a pixel attribute of the first pixel, and a pixel attribute of the second pixel according to a map attribute of a first map of a 3D on-screen scene, and a map attribute of a second map of the 3D on-screen scene, wherein the first pixel corresponds to the first map, and the second pixel corresponds to the second map; wherein the 3D scene layer is a copy of the 3D on-screen scene and comprises the first map and the second map;

rendering the second map onto a render layer according to the map attribute of the second map; wherein the render layer before being rendered is a blank layer that is of a same size and spatially aligned to the 3D scene layer, and is used to increase a resolution of the second map in a display interface; and obtaining a rendering image that corresponds to the 3D on-screen scene by overlapping the 3D scene layer and the render layer, and displaying the rendering image in the display interface.

13. The non-transitory storage medium of claim 12, wherein each of the pixel attribute of the first pixel and the pixel attribute of the second pixel comprises a red-green-blue (RGB) value and a transparency value; and determining the first pixel in the 3D scene layer, the second pixel in the 3D scene layer, the pixel attribute of the first pixel and the pixel attribute of the second pixel according to the map attribute of the first map of the 3D on-screen scene, and the map attribute of the second map of the 3D on-screen scene comprises:

acquiring, based on a vertex shader, map texture coordinates of the first map, map texture coordinates of the second map, and a transformation matrix, and determining the first pixel of the 3D on-screen scene in the 3D scene layer, and the second pixel of the 3D on-screen scene in the 3D scene layer, wherein the transformation matrix comprises a rotation matrix and a translation matrix; and rendering a determined first pixel and a determined second pixel based on an RGB value of the determined first pixel and an RGB value of the determined second pixel, and rendering a transparency value of the second pixel into a first transparency value based on a pixel shader.

14. The non-transitory storage medium of claim 12, wherein rendering the second map onto the render layer according to the map attribute of the second map comprises:

determining a display position of the second map on the render layer according to map texture coordinates of the second map and a transformation matrix; and rendering the second map onto the render layer based on the display position and a second transparency value of the second map.

* * * * *